(12) United States Patent
Wegner et al.

(10) Patent No.: US 9,267,054 B2
(45) Date of Patent: Feb. 23, 2016

(54) SOLVENT-CONTAINING CLEARCOAT COATING COMPOSITION, PROCESS FOR PREPARATION THEREOF AND USE THEREOF

(71) Applicant: BASF Coatings GmbH, Münster (DE)

(72) Inventors: Egon Wegner, Greven (DE); Peter Mayenfels, Münster (DE)

(73) Assignee: BASF Coatings GmbH, Munster (DE)

( * ) Notice: Subject to any disclaimer, the term of this patent is extended or adjusted under 35 U.S.C. 154(b) by 0 days.

(21) Appl. No.: 14/360,133

(22) PCT Filed: Nov. 22, 2012

(86) PCT No.: PCT/EP2012/073392
§ 371 (c)(1),
(2) Date: May 22, 2014

(87) PCT Pub. No.: WO2013/076208
PCT Pub. Date: May 30, 2013

(65) Prior Publication Data
US 2014/0323620 A1  Oct. 30, 2014

Related U.S. Application Data

(60) Provisional application No. 61/563,623, filed on Nov. 25, 2011.

(30) Foreign Application Priority Data

Nov. 25, 2011  (EP) .................................... 11190752

(51) Int. Cl.
| C09D 133/10 | (2006.01) |
| C09D 133/06 | (2006.01) |
| C09D 7/00 | (2006.01) |
| C09D 7/12 | (2006.01) |

(52) U.S. Cl.
CPC ............... *C09D 133/10* (2013.01); *C09D 7/00* (2013.01); *C09D 133/066* (2013.01); *C09D 7/125* (2013.01); *C09D 7/1216* (2013.01)

(58) Field of Classification Search
None
See application file for complete search history.

(56) References Cited

U.S. PATENT DOCUMENTS

| 3,290,350 | A | | 12/1966 | Hoover | |
| 3,998,768 | A | * | 12/1976 | Pettit, Jr. ............ | C08G 18/4063 524/311 |
| 4,076,766 | A | * | 2/1978 | Simms ........................... | 525/166 |
| 4,130,577 | A | | 12/1978 | Nagato et al. | |
| 4,246,382 | A | | 1/1981 | Honda et al. | |
| 4,439,616 | A | | 3/1984 | Singh et al. | |
| 4,444,954 | A | | 4/1984 | Mels et al. | |
| 4,565,730 | A | * | 1/1986 | Poth ................... | C08G 18/6229 427/385.5 |
| 4,677,028 | A | * | 6/1987 | Heeringa et al. ........... | 428/422.8 |
| 4,710,542 | A | | 12/1987 | Forgione et al. | |
| 5,322,715 | A | * | 6/1994 | Jouck ................. | A61G 7/05769 427/409 |
| 5,576,386 | A | | 11/1996 | Kempter et al. | |
| 5,690,569 | A | | 11/1997 | Ledvina et al. | |
| 5,726,258 | A | | 3/1998 | Fischer et al. | |
| 5,990,221 | A | | 11/1999 | Dames et al. | |
| 6,013,326 | A | * | 1/2000 | Flosbach et al. ........... | 427/407.1 |
| 6,160,049 | A | | 12/2000 | Mathauer et al. | |
| 6,403,699 | B1 | | 6/2002 | Rockrath et al. | |
| 6,410,646 | B1 | | 6/2002 | Rockrath et al. | |
| 7,019,052 | B1 | | 3/2006 | Rink et al. | |
| 7,122,161 | B1 | | 10/2006 | Mortiz et al. | |
| 7,261,926 | B2 | | 8/2007 | Schwarte et al. | |
| 7,446,149 | B2 | * | 11/2008 | Rihan .................... | B05D 7/534 427/407.1 |
| 2004/0063851 | A1 | | 4/2004 | Neppl et al. | |
| 2006/0173120 | A1 | | 8/2006 | Baumgart et al. | |
| 2007/0054999 | A1 | * | 3/2007 | Ketteler et al. ................ | 524/275 |
| 2012/0034457 | A1 | | 2/2012 | Low et al. | |

(Continued)

FOREIGN PATENT DOCUMENTS

| DE | 2848906 | 5/1979 |
| DE | 19524182 | 1/1997 |

(Continued)

OTHER PUBLICATIONS

PCT International Search Report in PCT/EP2012/073392, mailed Mar. 20, 2013, 4 pages.

(Continued)

*Primary Examiner* — Satya Sastri
(74) *Attorney, Agent, or Firm* — Servilla Whitney LLC

(57) ABSTRACT

Described is a solvent-containing clearcoat coating composition comprising (A) an OH-functional (meth)acrylate (co)polymer component composed of (A1) at least one OH-functional (meth)acrylate (co)polymer having an OH number of 60-200 mg KOH/g and a glass transition temperature $T_g$ of 15° C. to 100° C., and (A2) at least one OH-functional (meth)acrylate (co)polymer having an OH number of 60-200 mg KOH/g and a glass transition temperature $T_g$ of −100° C. to −20° C.; (B) a crosslinker component comprising at least one crosslinking agent having functional groups that are reactive toward OH groups; and also (C) at least one polyamide; and (D) at least one urea compound, which is an adduct of a polyisocyanate and methoxypropylamine.

Also described is a process for preparing the solvent-containing clearcoat coating composition, to the use of the solvent-containing clearcoat coating composition and a clearcoat which has been produced using the clearcoat coating composition.

14 Claims, No Drawings

(56) References Cited

U.S. PATENT DOCUMENTS

| | | | |
|---|---|---|---|
| 2012/0226075 A1 | | 9/2012 | Leutfeld et al. |
| 2014/0147596 A1* | | 5/2014 | Wegner et al. ............. 427/393.5 |

FOREIGN PATENT DOCUMENTS

| | | |
|---|---|---|
| DE | 19709476 | 11/1997 |
| DE | 19628142 | 1/1998 |
| DE | 19628143 | 1/1998 |
| DE | 19709465 | 9/1998 |
| DE | 19828742 | 12/1999 |
| DE | 19850243 | 5/2000 |
| EP | 0008127 | 2/1980 |
| EP | 101832 | 3/1984 |
| EP | 0129124 | 12/1984 |
| EP | 0245700 | 11/1987 |
| EP | 0249201 | 12/1987 |
| EP | 0554783 | 8/1993 |
| EP | 0276501 | 8/1998 |
| EP | 229265 | 3/2011 |
| WO | WO-82/02387 | 7/1982 |
| WO | WO-94/22968 | 10/1994 |
| WO | WO-95/27742 | 10/1995 |
| WO | WO-97/12945 | 4/1997 |
| WO | WO-98/02466 | 1/1998 |
| WO | WO-02/44235 | 6/2002 |
| WO | WO-03/000807 | 1/2003 |
| WO | WO-2004/069884 | 8/2004 |
| WO | WO-2004/111139 | 12/2004 |
| WO | WO-2010/121791 | 10/2010 |

OTHER PUBLICATIONS

PCT International Preliminary Report on Patentability in PCT/EP2012/073392, mailed Jun. 5, 2014, 9 pages.

* cited by examiner

SOLVENT-CONTAINING CLEARCOAT COATING COMPOSITION, PROCESS FOR PREPARATION THEREOF AND USE THEREOF

CROSS-REFERENCE TO RELATED APPLICATIONS

This application is the National State entry of PCT/EP2012/073392, filed on Nov. 22, 2012, which claims priority to U.S. Provisional Application Ser. No. 61/563,623, filed on Nov. 25, 2011 and European Patent Application No. 11190752.3, filed on Nov. 25, 2011, the disclosures of which are incorporated herein by reference in their entireties.

TECHNICAL FIELD

The present invention relates to a solvent-containing clearcoat coating composition comprising at least two OH-functional (meth)acrylate (co)polymers as binders, at least one kind of synthetic polyamide wax particles, at least one urea compound as an adduct of a polyisocyanate and a monoamine, and a crosslinking agent having functional groups that are reactive toward OH groups. The present invention further relates to the preparation of the clearcoat coating composition and also to the use thereof for the coating of different substrates.

BACKGROUND

In present-day automobile finishing, different substrates are painted, such as bodies and bodywork parts produced from metal or plastic, for example. Frequently in such applications, multicoat paint systems are constructed. Multicoat paint systems on metallic substrates consist frequently of an electrodeposition coat, a primer-surfacer coat, a basecoat, and a clearcoat. In the case of plastics substrates, either single-coat finishes or, again, multicoat paint systems are constructed. In the latter case, the customary primer-surfacer, single-coat topcoat, basecoat and clearcoat coating compositions that can be employed in the painting of plastics are employed, the selection and use of these compositions being known to the skilled person.

The high technological requirement which is imposed on finishes in the segment of the present-day automobile industry, and also the functions and technological properties of each of the individual coats identified above, are known to the skilled person. In such systems it is the clearcoats in particular that define such essential technical properties as, for example, the gloss and the brilliance or distinctiveness of image (DOI), the weathering stability, and also the resistance to condensation and blushing of the painted surface. Key to these properties is that the clearcoat coating compositions necessary for the construction of clearcoats have outstanding application properties. This means, in particular, that the coating compositions must have good leveling. This implies that the clearcoat coating compositions must have flow properties such that, following their application to a substrate, unevennesses which have come about, for example, as a result of spray mist are evened out and hence the surface of the resulting finish is smooth. Likewise important, moreover, is that the coating compositions have a good sag behavior. As the skilled person is aware, following the application of coating compositions to a substrate, there is a risk of runs forming as long as the coating compositions are still in the liquid state. This means that the applied coating compositions, still liquid, undergo partial sagging. The result is a very visible finishing defect in the subsequently cured finish. The tendency to form runs increases disproportionately with the selected wet film thickness, which must therefore be selected appropriately. However, it cannot be selected to be too low, so that complete coverage of the substrate surface is ensured and so that the surface quality requirements are met. In the finishing of articles of complex shape, such as are frequently encountered in the context of automobile finishing (e.g., bodywork, doors or bumpers), the problem of formation of runs occurs more frequently, since in this case it is not possible to paint the entire surface in the horizontal position.

A further problem that plays a large part in the automobile finishing segment in particular is the circuit-line stability of the coating compositions. As a result of their continual revolution in the application plants, the coating compositions are exposed to continual loading or shearing stress, which frequently results in a significant change to the rheological properties, such as the viscosity, and hence may adversely affect the applications properties referred to above.

The existing solvent-containing clearcoat coating compositions are frequently not able to ensure effective leveling and at the same time to prevent the formation of runs in the clearcoats produced from them. To solve the problems, the automakers frequently reduce the film thickness of the clearcoats, but this greatly detracts from such essential performance properties as topcoat holdout, leveling, gloss, distinctiveness of image, and weathering and UV stability, and can lead to matting of the clearcoats. On the part of the clearcoat manufacturers, attempts are made to avoid the problems by adding sizable amounts of rheological assistants or of rheology-control additives, such as the sag control agents (SCA) that are known from the applications WO 94/22968 A 1, EP 0 276 501 A 1, EP 0 249 201 A 1 or WO 97/12945 A 1 and which are based, for example, on particular urea adducts. Likewise used are the crosslinked polymeric microparticles, as disclosed in EP 0 008 127 A 1, for example, the inorganic phyllosilicates such as aluminum magnesium silicates, sodium magnesium and sodium magnesium fluorine lithium phyllosilicates of the montmorillonite type, the silicas such as Aerosils, or the synthetic polymers having ionic and/or associative groups, such as polyvinyl alcohol, poly(meth)acrylamide, poly(meth)acrylic acid, polyvinylpyrrolidone, styrene-maleic anhydride copolymers or ethylene-maleic anhydride copolymers and derivatives thereof, or hydrophobically modified ethoxylated urethanes or polyacrylates. Such use, however, may result in a deterioration in the topcoat holdout, because, for example, the leveling of the clearcoats is adversely affected.

The use of polyamides as thickeners for solvent-containing coating materials is known from the textbook "Lackadditive" by Johan Bieleman, Wiley-VCH, Weinheim, N.Y., 1998, page 62, and also from the application WO 2004/111139.

It is additionally known, from technical data sheet 11.20.3 from C. H. Erbslöh, DISPARLON 6900-20x, October 1986, for example, that swollen particles of synthetic polyamide wax can be used as antirun/antisettling agents for solvent-based resin systems (e.g. clearcoats), solvents, high-build coatings of epoxy resins, tar/epoxy resin mixtures, tar/polyurethane mixtures, and chlorinated rubber, aluminum pigments in automotive paints, heavy pigments in rustproofing coatings and carpet-backing coatings, and gel coatings (glass fiber-reinforced plastics). Patent application WO 2004/111139 A1 uses a combination of a hexylamine-based urea compound and polyamide wax particles as a rheological assistant. However, even through the use of these swollen particles of synthetic polyamide wax, or a combination thereof with the stated urea compound, it is not possible to provide a satisfactory solution to the problems addressed above and to achieve a good balance of applications properties such as leveling and formation of runs in tandem with a high stability toward shear stress, and also coating properties such as, for example, good condensation resistance.

Accordingly, a clearcoat coating composition which no longer has the disadvantages of the prior art, but instead exhibits an outstanding balance between the application properties of leveling and formation of runs, so that the clearcoat which results after curing on a substrate has a high optical quality, e.g. a high gloss is desired. In addition, the cured coatings are to exhibit high resistance to condensation and blushing. Also, moreover, further important technological requirements are to be met that are imposed on coating materials for use, in particular, in the automobile finishing segment. The clearcoat coating materials are in particular to possess good circuit-line stability or stability under shearing stress, which means that their profile of rheological properties, more particularly their viscosity, is not to undergo excessive alteration in spite of exposure to shearing stress. In this way, the applications properties identified above are to remain intact despite prolonged revolution in circuit-line systems, for example.

SUMMARY

A first aspect of the present invention is directed to a solvent-containing clearcoat coating composition. In a first embodiment, a solvent-containing clearcoat coating composition comprises (A) 30 to 80% by weight, based on the nonvolatile fraction of the overall clearcoat coating composition of an OH-function (meth)acrylate (co)polymer component composed of (A1) 30%-99% by weight, based on the mass of the nonvolatile fraction of the OH-functional (meth) acrylate (co)polymer component (A), of at least one OH-functional (meth)acrylate (co)polymer having an OH number of 60-200 mg KOH/g and a glass transition temperature $T_g$ of 15° C. to 100° C., and (A2) 1%-70% by weight, based on the mass of the nonvolatile fraction of the OH-functional (meth) acrylate (co)polymer component (A), of at least one OH-functional (meth)acrylate (co)polymer having an OH number of 60-200 mg KOH/g and a glass transition temperature $T_g$ of −100° C. to −20° C.; (B) a crosslinker component comprising at least one crosslinking agent having functional groups that are reactive toward OH groups; and also (C) 0.02%-1.2% by weight, based on the mass of the nonvolatile fraction of the OH-functional (meth)acrylate (co)polymer component (A), of at least one polyamide; (D) 0.04%-2.9% by weight, based on the mass of the nonvolatile fraction of the OH-functional (meth)acrylate (co)polymer component (A), of at least one urea compound which is an adduct of a polyisocyanate and methoxypropylamine; and (E) 10% to 50% by weight, based on the mass of the nonvolatile fraction of component (A), of a polyester having an OH number of 8-280 mg KOH/g and a glass transition temperature $T_g$ of −80° C. to 20° C.

In a second embodiment, the solvent-containing clearcoat coating composition of the first embodiment is modified, wherein the (meth)acrylate (co)polymers (A1) and (A2) have an OH number of 70-180 mg KOH/g.

In a third embodiment, the solvent-containing clearcoat coating composition of the first and second embodiments is modified, wherein the crosslinking component (B) comprises as crosslinking agent(s) at least one polyisocyanate and/or at least one amino resin.

In a fourth embodiment, the solvent-containing clearcoat coating composition of the first through third embodiments is modified, wherein the crosslinking agents in the crosslinking component (B) are nonblocked polyisocyanates.

In a fifth embodiment, the solvent-containing clearcoat coating composition of the third and fourth embodiments is modified, wherein the crosslinking agent is a trimeric hexamethylene diisocyanate.

In a sixth embodiment, the solvent-containing clearcoat coating composition of the first through fifth embodiments is modified, wherein at least one polyester (E) having an OH number of 80-280 mg KOH/g and a glass transition temperature $T_g$ of −80° C. to 20° C. is present.

In a seventh embodiment, the solvent-containing clearcoat coating composition of the first through sixth embodiments is modified, wherein the solvent-containing clearcoat composition is a two-component clearcoat coating composition.

In an eighth embodiment, the solvent-containing clearcoat coating composition of the first through seventh embodiments is modified, wherein the polyamides (C) are synthetic polyamide waxes.

In a ninth embodiment, the solvent-containing clearcoat coating composition of the first through eighth embodiments is modified, wherein the polyamides (C) are reaction products of monomeric polyamines and (hydroxy) fatty acids which comprise 16 to 20 C atoms per molecule.

A second aspect of the present invention is directed to a process for preparing the solvent-containing clearcoat coating composition of the first through ninth embodiments. In a tenth embodiment, the process comprises mixing the OH-functional (meth)acrylate (co)polymer component, the crosslinker component, the polyamide, the urea compound, and the polyester.

In an eleventh embodiment, the process of the tenth embodiment is modified, wherein the OH-functional (meth) acrylate (co)polymer component (A) is mixed with the further constituents, apart from the crosslinker component (B), and the crosslinker component (B) with at least one organic solvent added is mixed in only within 30 minutes prior to application to a substrate.

In a twelfth embodiment, the process of the tenth and eleventh embodiments is modified, wherein the urea compound is added in the form of a paste which comprises a mixture of the urea compound with a polyester and/or a (meth)acrylate (co)polymer and at least one organic solvent.

In a thirteenth embodiment, the process of the tenth through twelfth embodiments is modified, wherein the polyamides are added in the form of a dispersion which comprises a mixture of the polyamides with a (meth)acrylate (co)polymer and at least one organic solvent.

A third aspect of the present invention is directed to a method of producing a cured cleared. In a fourteenth embodiment, the method comprises applying the solvent-containing clearcoat coating composition of the first through ninth embodiments to a substrate, and subsequently thermal curing at a temperature of 40 to 190° C.

An additional aspect of the present invention is directed to a clearcoat. A fifteenth embodiment is directed to a clearcoat on a substrate, comprising the clearcoat coating composition of the first through ninth embodiments coated onto a substrate.

DETAILED DESCRIPTION

Provided is a solvent-containing clearcoat coating composition comprising (A) an OH-functional (meth)acrylate (co)polymer component composed of (A1) 30%-99% by weight, based on the mass of the nonvolatile fraction of the OH-functional (meth)acrylate (co)polymer component (A), of at least one OH-functional (meth)acrylate (co)polymer having an OH number of 60-200 mg KOH/g and a glass transition temperature $T_g$ of 15° C. to 100° C.

(A2) 1%-70% by weight, based on the mass of the nonvolatile fraction of the OH-functional (meth)acrylate (co)polymer component (A), of at least one OH-functional (meth)acrylate (co)polymer having an OH number of 60-200 mg KOH/g and a glass transition temperature $T_g$ of −100° C. to −20° C., (B) a crosslinker component comprising
at least one crosslinking agent having functional groups that are reactive toward OH groups,
and also (C) 0.02%-1.2% by weight, based on the mass of the nonvolatile fraction of the OH-functional (meth)acrylate (co)polymer component (A), of at least one polyamide and (D) 0.04%-2.9% by weight, based on the mass of the nonvolatile fraction of the OH-functional (meth)acrylate (co)polymer component (A), of at least one urea compound which is an adduct of a polyisocyanate and methoxypropylamine.

In the text below, the solvent-containing clearcoat coating composition is referred to as clearcoat coating composition of the invention. The clearcoat coating composition of one or more embodiments has a good stability with respect to shearing stress and possesses, moreover, outstanding applications properties. Following application to a substrate, a very good balance of appropriate leveling and only slight running tendency is achieved, and so the cured clearcoats have, for example, a good gloss. Furthermore, good condensation is achieved. Outstandingly suitable substrates include bodies and bodywork parts made of metal or plastic, from the automobile finishing segment, which are frequently of complex shape. The clearcoat coating composition may serve for construction of a clearcoat which, either itself or as part of a multicoat paint system, covers a metal or plastics substrate.

In one or more embodiments, constant conditions were selected in each case for the determination of nonvolatile fractions (NVF, solids), unless indicated otherwise. For the determination of the nonvolatile fraction, an amount of 2 g of the constituent in question, for example of a dispersion of a polymer or of a resin in appropriate solvents, is heated at 125° C. for 2 hours, cooled to 20° C., and then the remainder is weighed (cf. also ISO 3251). The nonvolatile fraction of for example, corresponding dispersions of polymers and/or resins which are present in the clearcoat coating composition of the invention was determined, in order thereby to allow determination, for example, of the weight fraction of a particular constituent in relation to the amount of another constituent.

In one or more embodiments, the hydroxyl number or OH number indicates the amount of potassium hydroxide in milligrams that is equivalent to the molar amount of acetic acid bound on acetylation of one gram of the respective constituent. In the context of the present invention, unless indicated otherwise, the hydroxyl number is determined experimentally by titration in accordance with DIN 53240-2 (Determination of hydroxyl value—Part 2: Method with catalyst).

The glass transition temperature $T_g$ for the purposes of the invention is determined experimentally in a method based on DIN 51005 "Thermal Analysis (TA)—Terms" and DIN 53765 "Thermal Analysis—Dynamic Scanning Calorimetry (DSC)". With this method, a sample of 10 mg is weighed out into a sample boat and introduced into a DSC instrument. It is cooled to the starting temperature and then a 1st and 2nd measurement run is conducted with an inert gas flush ($N_2$) of 50 ml/min and with a heating rate of 10 K/min, with cooling again to the starting temperature between the measurement runs. Measurement takes place typically in the temperature range from about 50° C. lower than the anticipated glass transition temperature to about 50° C. higher than the glass transition temperature. The glass transition temperature for the purposes of the present invention, based on DIN 53765, Section 8.1, is the temperature in the 2nd measurement run at which half of the change in specific heat capacity (0.5 delta $c_p$) is attained. It is determined from the DSC diagram (plot of the heat flow against the temperature), and is the temperature of the point of intersection of the middle line between the extrapolated baselines before and after the glass transition with the measurement curve.

(A) OH-Functional (Meth)Acrylate (Co)Polymer Component

The clearcoat coating composition comprises an OH-functional (meth)acrylate (co)polymer component (A). Component (A) comprises at least one OH-functional (meth)acrylate (co)polymer (A1) as specified later on below, and also at least one OH-functional (meth)acrylate (co)polymer (A2) as specified later on below.

A (meth)acrylate (co)polymer, as is known, is a polymeric organic compound which is composed of different acrylate and/or methacrylate monomers. The term (meth)acrylate in the context of the invention stands for acrylates and/or methacrylates, or for those compounds which contain or are constructed from acrylates and/or methacrylates. Examples of such acrylate and methacrylate monomers include various alkyl (meth)acrylates and cycloalkyl (meth)acrylates such as, for example, the compounds—known to the skilled person—ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and also cyclopentyl acrylate, cyclopentyl methacrylate, isobornyl acrylate, isobornyl methacrylate, cyclohexyl acrylate and cyclohexyl methacrylate.

The (meth)acrylate (co)polymers (A1) and (A2) are OH-functional and have an OH number of 60-200 mg KOH/g, specifically 70-180 mg KOH/g, very specifically 80-160 mg KOH/g. Accordingly, incorporated in the polymer framework are certain fractions of such acrylate and methacrylate monomers which have OH groups and therefore account for the OH functionality of the (meth)acrylate (co)polymer binder.

Hydroxyl-containing monomer units used for preparing the (meth)acrylate (co)polymers (A1) and (A2) include hydroxyalkyl (meth)acrylates, such as, for example, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate and also, in particular, 4-hydroxybutyl acrylate and/or 4-hydroxybutyl methacrylate.

Further monomer units used for the (meth)acrylate (co)polymers (A1) and (A2) may be vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

The at least one (meth)acrylate (co)polymer (A1) has a glass transition temperature $T_g$ of 15° C. to 100° C., specifically of 20° C. to 70° C., very specifically of 25° C. to 50° C. The at least one (meth)acrylate (co)polymer (A2) possesses a glass transition temperature $T_g$ of −100° C. to −20° C., specifically −90° C. to −35° C., very specifically of −80° C. to −45° C. As the skilled person in the field is aware, the glass transition temperature of (meth)acrylate (co)polymers is defined, for example, through the nature of the monomers present and through their proportions in the polymer. A corresponding selection may be made by the skilled worker without substantial effort.

The fraction of the (meth)acrylate (co)polymer (A1), based on the mass of the nonvolatile fraction of the OH-functional (meth)acrylate (co)polymer component (A), is in accordance with the invention 30%-99%, specifically 55%-90%, more particularly 70%-85%, by weight.

The fraction of the (meth)acrylate (co)polymer binder (A2), based on the mass of the nonvolatile fraction of the OH-functional (meth)acrylate (co)polymer component (A), is in accordance with the invention 1%-70%, specifically 10%-45%, more particularly 15%-30%, by weight.

In one or more embodiments, the fraction of the (meth)acrylate (co)polymer (A1), based on the mass of the nonvolatile fraction of the overall coating composition, is greater than the fraction of the (meth)acrylate (co)polymer (A2) having the lower glass transition temperature. In one or more embodiments, the fraction of the (meth)acrylate (co)polymer (A1) is more than twice as high as the fraction of the (meth) acrylate (co)polymer (A2).

In one or more embodiments, the fraction of the OH-functional (meth)acrylate (co)polymer component (A) as a proportion of the overall coating material composition is between 30% to 80% by weight, more specifically between 40% to 70% by weight, more particularly 45% to 55% by weight, based in each case on the nonvolatile fraction of the overall clearcoat coating composition.

The molecular weights of the (meth)acrylate (co)polymers (A1) and (A2) are within the ranges familiar to the skilled person, and are ultimately not subject to any restrictions. In specific embodiments, preference is given to number-average molecular weights $M_n$ of between 1000 to 20 000 g/mol, more particularly between 1000 to 10 000 g/mol.

The number-average molecular weight $M_n$ is determined by means of gel permeation chromatography at 40° C. with a high-pressure liquid chromatography pump and a refractive index detector. The eluent used was tetrahydrofuran, with an elution rate of 1 ml/min. Calibration is carried out by means of polystyrene standards.

As (meth)acrylate (co)polymers (A1) and (A2) it is possible to use not only customary commercially available but also independently prepared (meth)acrylate (co)polymers. Examples of commercial (meth)acrylate (co)polymers include the polyacrylates from the "Macrynal" product series (Cytec Surface Specialities) or the Setalux product series, for example Setalux 1753 SS-70, (Nuplex Resins).

The preparation of the (meth)acrylate (co)polymers (A1) and (A2) has no technical peculiarities in terms of process, but instead is accomplished, for example, with the aid of the methods, customary and known within the plastics field, of continuous or batchwise, free-radically initiated copolymerization in bulk, solution, emulsion, miniemulsion or microemulsion, under atmospheric or superatmospheric pressure, in stirred tanks, autoclaves, tube reactors, loop reactors or Taylor reactors, at temperatures of specifically 50 to 200° C.

Examples of suitable copolymerization processes are described in patent applications DE 197 09 465 A 1, DE 197 09 476 A 1, DE 28 48 906 A 1, DE 195 24 182 A 1, DE 198 28 742 A 1, DE 196 28 143 A 1, DE 196 28 142 A 1, EP 0 554 783 A 1, WO 95/27742 A 1, WO 82/02387 A 1 or WO 98/02466 A 1. The copolymerization may alternatively be carried out in polyols (thermally curable reactive diluents) as reaction medium, as described in German patent application DE 198 50 243 A 1, for example.

Examples of suitable free-radical initiators are dialkyl peroxides, such as di-tert-butyl peroxide or dicumyl peroxide, hydroperoxides, such as cumene hydroperoxide or tert-butyl hydroperoxide, peresters, such as tert-butyl perbenzoate, tert-butyl perpivalate, tert-butyl per-3,5,5-trimethylhexanoate or tert-butyl per-2-ethylhexanoate, peroxodicarbonates, potassium, sodium or ammonium peroxodisulfate, azo initiators, examples being azodinitriles such as azobisisobutyronitrile, C—C-cleaving initiators such as benzpinacol silyl ethers, or a combination of a nonoxidizing initiator with hydrogen peroxide. Combinations of the above-described initiators may also be employed.

Further examples of suitable initiators are described in German patent application DE 196 28 142 A 1, page 3 line 49 to page 4 line 6. It is possible, furthermore, to use thiocarbonylthio compounds or mercaptans such as dodecylmercaptan as chain transfer agents or molecular weight regulators.

Additionally present in the clearcoat coating material composition may be further organic monomeric, oligomeric and polymeric compounds, principally polymeric compounds, different from the compounds of the OH-functional (meth) acrylate (co)polymer component (A), as binders. By binders are meant the compounds familiar to the skilled person in the field that are responsible primarily for film formation in coating compositions, alongside the crosslinking agents described later on below. These also include, accordingly, the (meth)acrylate (co)polymers (A1) and (A2) described earlier on above. Oligomeric compounds are, as is known, those constituents in which only a few—that is, for example, at least 2 to 10-monomer units are linked with one another. Polymeric compounds, accordingly, are those in which, for example, more than 10 monomer units are linked, and where, depending on the molar masses of the monomers employed, the number-average molecular weight is frequently, for example, more than 1000 g/mol. As the skilled person is aware, polymeric compounds of this kind are, for example, (co)polymers of at least one monomeric compound that are of random, alternating and/or blocklike construction and of linear, branched and/or comblike construction. Ultimately contemplated, apart from the (meth)acrylate (co)polymers (A1) and (A2) described earlier on above and the crosslinking agents described later on below, are all organic monomeric, oligomeric and polymeric, principally polymeric, compounds that are known to the skilled person in this context.

Present in particular may be further (co)polymers of ethylenically unsaturated monomers that are of random, alternating and blocklike construction, and of linear, branched and/or comblike construction. Besides the stated OH-functional (meth)acrylate (co)polymers (A1) and (A2) it is also possible, for example, for further (meth)acrylate (co)polymers, different from the (meth)acrylate (co)polymers (A1) and (A2), to be present, having glass transition temperatures T, and/or OH numbers that are different from the glass transition temperatures and OH numbers of the (meth)acrylate (co)polymers (A1) and (A2) as described earlier on above, in the clearcoat coating material compositions.

Examples of further, suitable (co)polymers of ethylenically unsaturated monomers, in addition to the (meth)acrylate (co)polymers already described comprehensively, include partially hydrolyzed polyvinyl esters.

Also present may be polyaddition resins and/or polycondensation resins as binders. Examples of suitable polyaddition resins and/or polycondensation resins are polyesters, alkyds, polyurethanes, polylactones, polycarbonates, poly-ethers, epoxy resin-amine adducts, polyureas, polyamides, polyimides, polyester-polyurethanes, polyether-polyurethanes or polyester-polyether-polyurethanes.

In one or more embodiments, in the clearcoat coating material composition of the invention there is at least one polyester present, more particularly exactly one polyester. A polyester, as is known, is a polymeric organic compound which comprises organic polyols and polybasic organic carboxylic acids, or consists of such components. These polyols and polycarboxylic acids are linked to one another by esterification, in other words by condensation reactions. Accordingly, the polyesters are assigned to the group of the polycondensation resins. Depending on nature, functionality, fractions used, and proportions of the starting components, linear or branched products, for example, are obtained. Whereas linear products come about primarily when using difunctional starting components (diols, dicarboxylic acids), the use of higher polyfunctional alcohols (OH functionality, in other words number of OH groups per molecule, of more than 2), for example, brings about branching. In the course of the preparation it is, naturally, also possible to make proportional use of monofunctional components, such as monocarboxylic acids, for example. As is known, polyesters may also be prepared using, instead of or in addition to the corresponding organic carboxylic acids, the anhydrides of the carboxylic acids, more particularly the anhydrides of dicarboxylic acids. Likewise possible is preparation through the use of hydroxycarboxylic acids or the lactones derived from the hydroxycarboxylic acids by intramolecular esterification.

Very generally, in the preparation of polyesters, it is possible to employ polycarboxylic acids and polyols, for example aliphatic polycarboxylic acids and aliphatic polyols. Likewise possible for use are aromatic polycarboxylic acids and aromatic polyols, or else polycarboxylic acids and polyols which in addition to the functional groups which identify their class of compound contain not only (linear, branched and/or cyclic) aliphatic but also aromatic groups. Also possible is the use of linear, branched and/or cyclic aliphatic and/or aromatic hydroxycarboxylic acids and also lactones, in other words hydroxycarboxylic acids and lactones which, in addition to the functional groups which identify their class of compound, have linear, branched and/or cyclic aliphatic and/or aromatic groups.

Suitable diols are, for example, alkylene glycols, such as ethylene glycol, propylene glycol, butylene glycol, butane-1,4-diol, hexane-1,6-diol, neopentyl glycol, and other diols, such as 1,4-dimethylolcyclohexane or 2-butyl-2-ethyl-1,3-propanediol. Suitable higher polyfunctional alcohols (OH functionality more than 2) are, for example, trimethylolpropane, glycerol, and pentaerythritol.

The acid component of a polyester generally comprises dicarboxylic acids having 2 to 44, specifically 4 to 36, carbon atoms in the molecule. Examples of suitable acids are o-phthalic acid, isophthalic acid, terephthalic acid, tetrahydrophthalic acid, hexahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. In place of the acids it is also possible to use their anhydrides, where they exist, for preparing the polyesters. Specifically, however, isophthalic acid and/or hexahydrophthalic acid, and also the anhydride of hexahydrophthalic acid, are used for preparing the polyesters. Especially preferred is the use of hexahydrophthalic acid and the anhydride of hexahydrophthalic acid. The polyesters therefore comprise the stated preferred dicarboxylic acids as monomer units. It is also possible to use higher polyfunctional carboxylic acids having 3 or more carboxyl groups (and/or the corresponding anhydrides), an example being trimellitic anhydride. Frequently use is also made, proportionally, of monocarboxylic acids, such as unsaturated fatty acids, for example.

Examples of hydroxycarboxylic acids which can be used are hydroxycaproic acid, hydroxybutyric acid, hydroxydecanoic acid and/or 12-hydroxystearic acid. Examples of lactones which can be employed are the conventional beta-, gamma-, delta-, and epsilon-lactones, more particularly epsilon-caprolactone.

Besides the above-described monomeric compounds it is also possible, for example, to use starting products which are already polymeric—for example, as diols, the conventional polyester diols obtained by reacting a lactone with a dihydric alcohol.

The at least one polyester is more particularly OH-functional. The clearcoat coating composition of the invention accordingly comprises at least one, specifically precisely one, polyester (E) having an OH number of 80-280 mg KOH/g, specifically 100-260 mg KOH/g, very specifically of 175-200 mg KOH/g. The polyester (E) therefore specifically possesses a high amount of OH groups.

The at least one polyester (E) possesses a glass transition temperature $T_g$ of −80° C. to 20° C., specifically −60° C. to 10° C., very specifically of −40° C. to −10° C.

As polyesters (E) it is possible to use not only customary polyesters that are available commercially but also self-prepared polyesters. Examples of commercial polyesters include the polyesters of the Setal product series, an example being Setal 166 SS-80 (Nuplex Resins).

The preparation of polyesters has no peculiarities in terms of process, and takes place generally via the conventional and known polymerization processes, more particularly polycondensation processes, in bulk, solution, emulsion, miniemulsion or microemulsion, in stirred tanks, autoclaves, tube reactors, loop reactors or Taylor reactors, at temperatures of specifically 50 to 300° C., using, where appropriate, the catalysts typical for such reactions, and/or the water separators that are typically employed for condensation reactions.

The fraction of the further organic monomeric, oligomeric, and polymeric, principally polymeric, compounds as binders, different from the compounds of the OH-functional (meth) acrylate (co)polymer component (A), in other words more particularly of the at least one polyester, is specifically not more than 50% by weight, based on the mass of the nonvolatile fraction of the OH-functional (meth)acrylate (co)polymer component (A).

Specifically there is at least one polyester (E) present in an amount of 10%-50% by weight, more particularly 20%-45% by weight, very specifically 25%-40% by weight, based in each case on the mass of the nonvolatile fraction of OH-functional (meth)acrylate (co)polymer component (A).

As is known, the described organic monomeric, oligomeric, and polymeric, principally polymeric compounds as binders may be cured, for example, thermally and/or with actinic radiation. They may, furthermore, be self-crosslinking and/or externally crosslinking, which means that both functional groups necessary for a particular crosslinking reaction are present in the organic compound as binder itself, and/or they contain only one of the two necessary functional groups for a particular crosslinking reaction, and crosslink using crosslinking agents which contain the complementary functional groups and are described later on below.

For a comprehensive description of these curing processes, with which the skilled person is familiar, reference is made to Römpp Lexikon Lacke and Druckfarben, Georg Thieme Verlag, Stuttgart, New York, 1998, pages 274-276, and also pages 542-544.

As already noted, the (meth)acrylate (co)polymers (A1) and (A2) are OH-functional, and thus contain OH groups. As the skilled person is aware, it is possible to bring about crosslinking reactions in a binder via OH groups as functional groups. In the context of the present invention, the OH groups of the (meth)acrylate (co)polymers (A1) and (A2) are utilized in order to bring about the three-dimensional crosslinking, in other words the curing, of the clearcoat coating composition of the invention, with complementary functional groups of crosslinking agents. Accordingly, in terms of their extant OH groups, the (meth)acrylate (co)polymers (A1) and (A2) are to be understood principally as externally crosslinking, and the clearcoat coating composition of the invention comprises a crosslinking component (B), comprising at least one crosslinking agent having functional groups which are reactive toward OH groups.

(B) Crosslinker Component

The clearcoat coating composition comprises a crosslinker component (B). A crosslinker component (B) for the purposes of the invention means the sum of all of the crosslinking agents present, with crosslinking agent referring more particularly to all organic monomeric, oligomeric, and polymeric compounds which are able to enter into crosslinking reactions with functional groups in the binders identified above—in other words, therefore, having functional groups that are complementary to such groups.

It is essential to the invention that the crosslinker component (B) comprises at least one crosslinking agent having functional groups which are reactive toward OH groups. Crosslinking agents of this kind that are employed in particular include nonblocked, partially blocked and/or blocked polyisocyanates and also amino resins. Very particular preference is given to the use of nonblocked polyisocyanates. For the purposes of the invention, polyisocyanates as crosslinking agents are understood to be organic compounds which contain at least two isocyanate groups per molecule. In principle it is possible to use all organic compounds that contain at least two isocyanate groups per molecule. It is also possible to use reaction products that contain isocyanate groups and are formed from, for example, polyols and polyamines and polyisocyanates.

It is also possible to use aliphatic or cycloaliphatic polyisocyanates, specifically diisocyanates, very specifically aliphatic diisocyanates, but more particularly hexamethylene diisocyanate, dimerized and/or trimerized hexamethylene diisocyanate.

Further examples of suitable polyisocyanates are isophorone diisocyanate, 2-isocyanatopropylcyclohexyl isocyanate, dicyclohexylmethane 2,4'-diisocyanate or dicyclohexylmethane 4,4'-diisocyanate, diisocyanates derived from dimer fatty acids, of the kind sold by Henkel under the trade name DDI 1410, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these polyisocyanates.

Likewise deserving of mention are, for example, tetramethylene 1,4-diisocyanate, cyclohexyl 1,4-diisocyanate, 1,5-dimethyl-2,4-di(isocyanatomethyl)benzene, 1,5-dimethyl-2,4-di(isocyanatoethyl)benzene, 1,3,5-trimethyl-2,4-di(isocyanatomethyl)benzene, 1,3,5-triethyl-2,4-di(isocyanatomethyl)benzene, dicyclohexyldimethylmethane 4,4'-diisocyanate, 2,4-tolylene diisocyanate, 2,6-tolylene diisocyanate and diphenylmethane 4,4'-diisocyanate.

In an especially preferred embodiment, the trimer of hexamethylene 1,6-diisocyanate is used as crosslinking agent; this compound is available, for example, as a commercial product under the name Desmodur N 3390 (Bayer MaterialScience) or Basonat HI190 (BASF SE).

Further examples of suitable polyisocyanates are organic polyisocyanates, more particularly so-called paint polyisocyanates, having aliphatically, cycloaliphatically, araliphatically and/or aromatically attached free isocyanate groups. Preference is given to using polyisocyanates having 2 to 5 isocyanate groups per molecule and having viscosities of 100 to 10 000, specifically 100 to 5000, and more particularly 100 to 2000 mPa·s (at 23° C.). Optionally, the polyisocyanates may also be admixed with small amounts of organic solvent, specifically 1% to 25% by weight, based on pure polyisocyanate, in order thus to improve the ease of incorporation of the isocyanate and optionally to lower the viscosity of the polyisocyanate to a level within the above-mentioned ranges. Examples of suitable solvent additions to the polyisocyanates include ethoxyethyl propionate, amyl methyl ketone or butyl acetate. Furthermore, the polyisocyanates may have been subjected to conventional hydrophilic or hydrophobic modification.

Also suitable, for example, are the polyurethane prepolymers that contain isocyanate groups and can be prepared by reacting polyols with an excess of polyisocyanates, and which are specifically of low viscosity. Further examples of suitable polyisocyanates are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example.

Further examples of suitable isocyanates are described in "Methoden der organischen Chemie", Houben-Weyl, volume 14/2, 4th edition, Georg Thieme Verlag, Stuttgart 1963, pages 61 to 70, W. Siefken, Liebigs Ann. Chem. 562, 75 to 136, European patent EP-A-101 832 or U.S. Pat. No. 3,290,350, U.S. Pat. No. 4,130,577, and U.S. Pat. No. 4,439,616.

The above-described polyisocyanates are crosslinking agents which are present in their free form, in other words nonblocked. These free polyisocyanates are generally used, as the skilled person is aware, in multicomponent coating systems, more particularly in two-component coating systems. For the present invention this means that the component (A) and the crosslinker component (B) of the clearcoat coating composition of the invention are stored separately from one another in the case of a two-component clearcoat coating composition, and are only combined immediately before the application of the clearcoat coating composition. This is done in order to prevent premature crosslinking of the binders, more particularly of the OH groups of the (meth)acrylate (co)polymers (A1) and (A2), and of the free polyisocyanate crosslinkers.

As indicated above, however, the use of polyisocyanates which are blocked is likewise possible. These blocked polyisocyanates are used as crosslinking agents in the context of the invention in the case of one-component clearcoat coating compositions, which means, therefore, that the OH-functional (meth)acrylate (co)polymer component (A) and the crosslinker component (B) can be stored as a mixture with one another and are not only mixed with one another shortly before application. In contrast to the free isocyanates, the blocked polyisocyanate crosslinkers are able to react only at elevated temperatures with the functional groups of the binders, more particularly the OH groups of the (meth)acrylate (co)polymers (A1) and (A2), in order to construct a three-dimensional network and hence to lead to the curing of the coating composition. It will be appreciated that such blocked polyisocyanate crosslinking agents may also be used in the multicomponent systems, more particularly two-component systems.

The reason why the blocked crosslinking agents bring about the curing of the coating composition only at elevated temperatures (approximately >80° C.-100° C.) is known to be that the blocking agents are eliminated from the isocyanate functions only at these temperatures, and so are then able to react with the complementary groups of the binders, more particularly the OH groups of the (meth)acrylate (co)polymers (A1) and (A2).

Examples of typical blocking agents are phenols, alcohols, oximes, pyrazoles, amines, and CH-acidic compounds such as diethyl malonate. The blocking reaction is carried out typically by reaction of the free NCO groups with the stated blocking agents in the presence, for example, of catalysts such as dibutyltin dilaurate or tin(II) bis(2-ethylhexanoate). The blocking agents and the corresponding reactions are known to the skilled person and are comprehensively described in the US patent specification U.S. Pat. No. 4,444,954, for example. Preferred for use as blocking agents are caprolactam, butanone oxime, acetone oxime, diethyl malonate, dimethylpyrazole or phenol.

In the context of the invention it is additionally possible with advantage to use amino resins as crosslinking agents. Particularly suitable are the customary and known amino resins, such as melamine-, benzoguanamine-, and urea-formaldehyde resins, for example. Preference is given to using melamine-formaldehyde resins. They are typically used in a form in which they are etherified with lower alcohols, usually methanol and/or butanol. One suitable amino resin is hexamethoxymethylmelamine, for example. Condensation products of other amines and amides may likewise be used, however, examples being aldehyde condensates of triazines, diazines, triazoles, guanidines, guanimines, and alkyl- and aryl-substituted derivatives of such compounds, including alkyl- and aryl-substituted melamines. Some examples of such compounds are N,N'-dimethylurea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, tris(alkoxycarbonylamino)triazine, and the like. It will be appreciated that condensation products with other aldehydes can also be used in addition to the condensation products with formaldehyde.

Also suitable are the customary and known amino resins some of whose methylol and/or methoxymethyl groups may have been defunctionalized by means of carbamate groups or allophanate groups. Crosslinking agents of this kind are described in patent specifications U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207.

Amino resins suitable in the context of the invention are available on the market under the trademarks Cymel, Luwipal, Maprenal, Resimene, and Beetle, for example.

In the case of the preferred crosslinking agents containing isocyanate groups, the at least one crosslinking agent is used specifically in an amount such that there is an excess of the total amount of reactive NCO groups in the crosslinking agent used in comparison to the total amount of hydroxyl groups in the compounds described earlier on above that are used as binders, in particular, therefore, of the (meth)acrylate (co)polymers (A1) and (A2). With particular preference, the ratio of the hydroxyl compounds of the compounds used as binders to the NCO groups of the at least one crosslinking agent is between 1:1 to 1:1.5, very specifically between 1:1.05 to 1:1.25, more particularly between 1:1.05 to 1:1.15.

The crosslinking component, more particularly the polyisocyanates and/or amino resins, more specifically the non-blocked polyisocyanates, are present specifically in an amount of 30%-80% by weight, more particularly 40%-70% by weight, very specifically 50%-65% by weight, based in each case on the mass of the nonvolatile fraction of the OH-functional (meth)acrylate (co)polymer component (A).

In this case, it is preferred if the fraction of the crosslinker component (B) as a proportion of the overall coating material composition is between 10% to 50% by weight, more specifically between 20% to 40% by weight, based in each case on the nonvolatile fraction of the overall clearcoat coating composition.

(C) Polyamides

The clearcoat coating composition of the invention comprises at least one polyamide as a rheological assistant. Polyamides are organic compounds which comprise at least two amide structures in the molecule. Compounds of this kind may be prepared, for example, by reacting polycarboxylic acids with polyamines and/or monoamines, or by reacting polyamines with monocarboxylic acids.

The polyamides are specifically synthetic polyamide waxes. Synthetic waxes are commonly understood by the skilled person to be synthetic organic products which have defined physical properties. These properties include in particular the facts that they are kneadable at up to 20° C., are solid to brittly hard, and are coarsely to finely crystalline, but not glasslike. In general they melt only at above 40° C., without decomposition, and above their melting point they undergo transition to the low-viscosity liquid melt state. The consistency is highly dependent on temperature.

Polyamides which exhibit the waxlike properties described and hence may be termed polyamide waxes are, for example, those obtained by reacting polyamines with fatty acids, more particularly fatty acids which comprise 16 to 20 C atoms per molecule. Examples of polyamines suitable for producing such polyamides or polyamide waxes include monomeric organic compounds having more than one amine group (monomeric polyamines), an example being 1,6-hexamethylenediamine. Synthetic polyamide waxes of this kind are therefore used specifically in the clearcoat coating composition of the invention. Particularly preferred polyamides or synthetic polyamide waxes as rheological assistants are reaction products of 1,6-hexamethylenediamine with fatty acids and/or hydroxy-fatty acids having 16 to 20 C atoms per molecule, more particularly hydroxy-fatty acids, specifically 12-hydroxystearic acid.

The preferred polyamide waxes are used more particularly in the form of particles. Typical average sizes of such polyamide was particles may be, for example, below 100 micrometers, more specifically below 80 micrometers, very specifically below 60 micrometers, and more particularly below 50 micrometers. In particular the range from 5 to 40 micrometers is especially advantageous. The determination of this average particle size is carried out by the known laser diffraction method, more particularly in accordance with DIN ISO 13320:2009 (determination of average particle size, that is the $d_{50}$ value).

The synthetic polyamides to be employed in accordance with the invention, more particularly the preferred polyamide wax particles, may be added as they are to the clearcoat coating compositions according to the invention. It is of advantage, however, to add them in the form of a dispersion in typical organic solvents (C), more particularly alcohols and/or xylene. The nonvolatile fraction of this dispersion may vary widely. They specifically comprise the polyamide (C) for use in accordance with the invention, more particularly the polyamide wax particles, in an amount from 5% to 40%, specifically 10% to 30%, and more particularly 15% to 25%, by weight, based in each case on the total amount of the dispersion. Such dispersions of various polyamide wax particles are available commercially, for example, under the trade name Disparlon (King Industries, USA, Kusumoto, Japan, or Erbslöh, Germany).

More particularly preferred in the context of the present invention is the use of polyamide wax particles based on hydroxystearic acid and 1,6-hexamethylenediamine in the form of a dispersion in organic solvents, as described above. A corresponding commercial product is available under the name Disparlon 6900-20X (Erbslöh).

It is especially preferred to use the polyamides (C), more particularly the polyamide waxes, in the form of a paste in the clearcoat coating composition of the invention. Besides the polyamide, the paste further comprises a (meth)acrylate (co)polymer, as described above, such as (meth)acrylate (co)polymer (A1) and/or (A2), for example, and also at least one typical organic solvent, examples being alcohols and/or aromatic solvents such as xylene and/or solvent naphtha. The paste comprises specifically 20% to 60%, more specifically 25% to 55%, and more particularly 30% to 50%, by weight, of a (meth)acrylate (co)polymer as described above, 3% to 9%, specifically 4% to 8%, and more particularly 5% to 7%, by weight, of the polyamide, based in each case on the total amount of the paste, and also at least one typical organic solvent.

Such pastes may be prepared without particular cost or complexity in terms of method, by mixing and homogenizing the constituents with the aid of conventional mixing techniques and apparatus. In particular, a dispersion of polyamide wax particles as described above (Disparlon 6900-20X, Erbslöh, for example) can be mixed with a (meth)acrylate (co)polymer in proportions such as to result in the above-stated proportions of the individual constituents in the paste.

The clearcoat coating composition of the invention comprises, in accordance with the invention, 0.02% to 1.2% by weight, specifically 0.1% to 1% by weight, based on the mass of the nonvolatile fraction of the OH-functional (meth)acrylate (co)polymer component (A), of at least one polyamide.

(D) Urea Compound as Adduct of a Polyisocyanate and a Monoamine

The clearcoat coating composition of the invention comprises at least one urea compound which is an adduct of a polyisocyanate and methoxypropylamine, as a further rheological assistant.

Polyisocyanates which can be used in principle are all inorganic compounds containing at least two isocyanate groups per molecule, examples being the polyisocyanates described above. It is also possible to use reaction products which contain isocyanate groups and are the products of reaction of for example, polyols and polyamines and polyisocyanates. Preference is given to using diisocyanates, very specifically aliphatic diisocyanates, more particularly hexamethylene diisocyanate. The following are mentioned as examples of polyisocyanates that can be used: tetramethylene 1,4-diisocyanate, hexamethylene 1,6-diisocyanate, cyclohexyl 1,4-diisocyanate, dicyclohexylmethane 4,4-diisocyanate, 1,5-dimethyl-(2,4-omega-diisocyanatomethyl)benzene, 1,5-dimethyl-(2,4-omega-diisocyanato-ethyl)benzene, 1,3, 5-trimethyl-(2,4-omega-diisocyanatomethyl)benzene, 1,3,5-triethyl-(2,4-omega-diisocyanatomethyl)benzene, the trimer of hexamethylene 1,6-diisocyanate, isophorone diisocyanate, 2,4-toluene diisocyanate, 2,6-toluene diisocyanate, -diisocyanate.

The urea compound is used specifically in the form of a paste, mixed with at least one typical organic solvent as described later on below, and also with at least one polyester and/or with a (meth)acrylate (co)polymer, specifically with a polyester (E), in the clearcoat coating composition of the invention. Thus the urea compound may be prepared, for example, directly in the presence of a polyester, in other words more particularly of one of the polyesters (E) characterized above. In this case the procedure, for example, is to add the methoxypropylamine to a solution of a polyester in an organic solvent or in a mixture of organic solvents, and then to add the polyisocyanate. The organic solvents contemplated are described later on below and are selected more particularly such that they do not enter into any disruptive interactions with the constituents that are present during the reaction, in other words with the methoxypropylamine, the at least one polyisocyanate, and the at least one polyester. In this context there may be also, for example, a linking of the polyisocyanate and/or of the urea compound, where it contains isocyanate groups that are still free, with the polyester. This is the case, for example, when the polyester contains OH groups. The paste then comprises a polyester which is modified with the urea compound for use in accordance with the invention. The urea compound is used, therefore, specifically at least proportionally in the form of an adduct of polyester and urea compound. The proportion of the urea compound described further on below, as a fraction of the clearcoat coating composition, is also based in this case exclusively on the urea compound, and not on the product of urea compound and polyester.

The resulting paste, in other words mixture or compound of urea-group-containing rheological assistant and polyester with organic solvents, is then used in the solvent-containing clearcoat coating composition of the invention.

Urea compounds as adduct of a polyisocyanate and methoxypropylamine in the form of mixtures with polyesters are also available, for example, under the trade names Setal, for example Setal 82166 SS-64 or Setal 81462 SS-55 (Nuplex Resins) and can be readily used in the clearcoat coating composition of the invention.

The clearcoat coating composition of the invention comprises, in accordance with the invention, 0.04% to 2.9% by weight, specifically 0.3% to 1.5% by weight, based on the mass of the nonvolatile fraction of the OH-functional (meth)acrylate (co)polymer component (A), of at least one urea compound which is an adduct of a polyisocyanate and methoxypropylamine.

The clearcoat coating composition of the invention further comprises at least one organic solvent. Suitable organic solvents are more particularly those which in the clearcoat coating composition are chemically inert toward the compounds (A) and (B), and which also do not react with (A) and (B) on curing of the clearcoat produced from the clearcoat coating composition of the invention.

Organic solvents are used which do not inhibit the crosslinking of the clearcoat coating composition of the invention and/or do not enter into chemical reactions with the other constituents of the clearcoat coating composition of the invention. The skilled person can therefore select suitable solvents easily on the basis of their known solvency and their reactivity.

Examples of such solvents are aliphatic and/or aromatic hydrocarbons such as toluene, xylene, solvent naphtha, Solvesso 100, or Hydrosol® (from ARAL), ketones, such as acetone, methyl ethyl ketone or methyl amyl ketone, esters, such as ethyl acetate, butyl acetate, butylglycol acetate, pentyl acetate or ethyl ethoxypropionate, ethers, or mixtures of the aforesaid solvents.

The clearcoat coating composition of the invention comprises specifically 30% up to 70%, more specifically 40% to 60%, by weight of organic solvents.

The clearcoat coating composition of the invention is solvent-containing. This means, in addition to the abovementioned fact that an organic solvent is present, in particular that the clearcoat coating composition does not contain more than 1%, specifically not more than 0.5%, with particular preference not more than 0.25%, by weight, of water, based on the total amount of the composition. For this purpose it is advantageous for the organic solvents or solvent mixtures present in the clearcoat coating composition to have a water content of not more than 1% by weight, more particularly not more than 0.5% by weight, based on the solvent.

Furthermore, the clearcoat coating composition of the invention may comprise at least one conventional coatings additive in effective amounts, in other words in amounts of specifically up to a maximum of 30%, more specifically up to a maximum of 25%, and more particularly up to a maximum of 20%, by weight, based in each case on the nonvolatile constituents of the clearcoat coating composition.

Examples of suitable coatings additives are as follows:
especially UV absorbers;
especially light stabilizers such as HALS compounds, benzotriazoles or oxalanilides;
nonhiding, transparent fillers, such as $SiO_2$ nanoparticles, barium sulfate, zinc oxide, and Aerosil
free-radical scavengers;
slip additives;
polymerization inhibitors;
defoamers;
reactive diluents of the kind which are common knowledge from the prior art;
wetting agents such as siloxanes, fluorine-containing compounds, carboxylic monoesters,
phosphoric esters, polyacrylic acids and copolymers thereof, or polyurethanes;
adhesion promoters such as tricyclodecanedimethanol;
film-forming assistants such as cellulose derivatives;
and/or flame retardants.

Besides the clearcoat coating composition of the invention, the present invention further provides the preparation of the clearcoat coating composition of the invention.

In terms of method, the preparation has no peculiarities, but instead takes place by the mixing and homogenizing of the above-described constituents using conventional mixing techniques and apparatus such as stirred tanks, agitator mills, extruders, compounders, Ultraturrax, in-line dissolvers, static mixers, toothed-wheel dispersers, pressure relief nozzles and/or microfluidizers, optionally with exclusion of actinic radiation.

In the case of the preferred two-component clearcoat coating systems, in other words, in particular, when using non-blocked polyisocyanates as crosslinkers in the crosslinker component (B), it is important that the component (A) and the hydroxy-functional polyester specifically present are stored separately from the crosslinker component (B) and are combined and mixed not until directly before application of the clearcoat coating composition, in order to prevent premature crosslinking of the binders, more particularly of the OH groups of the (meth)acrylate (co)polymer (A1), (A2) and of the polyester with the free polyisocyanates. In the case of two-component clearcoat coating systems, commonly the above-indicated constituents of the clearcoat coating composition of the invention, more particularly the rheological assistants (C) and (D), of the polyesters (E) and also organic solvents and any coatings additives present, are mixed with component (A) and optionally stored. This mixture is then admixed with the crosslinker component (B), which is generally present as a mixture with organic solvents, immediately prior to the application of the clearcoat coating composition of the invention. By admixing immediately prior to application is meant, in the context of the present invention, admixing within not more than 30 minutes, specifically not more than 15 minutes, prior to application.

The present invention further provides for the use of the clearcoat coating composition of the invention. The clearcoat coating composition of the invention is suitable more particularly for use in automotive finishing for producing clearcoats on different substrates, and is used accordingly. Accordingly, a clearcoat produced on a substrate using the clearcoat coating composition of the invention is additionally provided by the present invention.

Application of the clearcoat coating composition of the invention to a substrate may be accomplished by all customary application methods, such as, for example, spraying, knife coating, spreading, pouring, dipping, impregnating, trickling or rolling. In the course of such application, the substrate to be coated may itself be at rest, with the application unit or device being moved. Alternatively, the substrate to be coated, more particularly a coil, may also be moved, with the application unit being at rest relative to the substrate or being moved appropriately.

Preference is given to employing spray application methods, such as, for example, compressed air spraying (pneumatic application systems), airless spraying, high-speed rotation, electrostatic spray application (ESTA), optionally in conjunction with hot spray application such as hot air spraying, for example.

The film thickness in the cured, dry state is specifically between 20 and 70 micrometers.

Following application and before curing of the clearcoat coating composition of the invention, there may be a certain rest time or evaporation time. The rest time serves, for example, for leveling and for the devolatilization of the coating films, or for the evaporation of volatile constituents such as solvents. The rest time may be supported and/or shortened through the application of elevated temperatures and/or through a reduced atmospheric humidity, provided this does not entail any instances of damage to or alteration in the paint films, such as premature complete crosslinking, for instance.

Following application and, where practiced, the evaporation time of the clearcoat coating composition of the invention on a substrate, curing takes place, to form a clearcoat.

The thermal curing of the clearcoat coating composition of the invention has no peculiarities in terms of method, but instead takes place by the conventional methods such as heating in a forced-air oven or irradiation with IR lamps. The thermal cure here may also take place in stages. Another method of curing is that of curing with near infrared (NIR radiation). Particularly advantageous is the thermal curing of the clearcoat coating composition of the invention. The thermal cure is in general at a temperature of 30 to 200° C., more specifically 40 to 190° C., and in particular 50 to 180° C., during a time of 1 min up to 10 h, more specifically 2 min up to 5 h and more particularly 3 min up to 3 h. In the case of the two-component clearcoat coating systems that are employed with preference, the thermal cure takes place specifically at a temperature of 20 min-60 min at 80°-160° C. With a metal as substrate, the thermal cure takes place specifically for 20-40 min at 100° C.-160° C. With a plastic, as the preferred substrate, the thermal cure takes place for 30-60 min at 60-100° C. ("low-bake" method).

Either the substrate is coated directly (single-coat finishing) or else the clearcoat film is formed on existing paint films that have already been applied and optionally dried and/or cured, the result then being a multicoat paint system. The substrate is specifically a metallic substrate or a plastics substrate, for example those of the kind used for producing parts for installation in or on vehicles in automobile construction, such as PP/EPDM, polyamide and/or ABS, for example. Plastics substrates are especially preferred.

In case of metal substrates, the clearcoat is employed advantageously as part of a multicoat paint system comprising an electrocoat, a primer-surfacer coat, a basecoat, and the clearcoat of the invention. In the case of plastics substrates, either single-coat finishes or likewise multicoat paint systems are constructed. In the latter case, the customary primer-surfacer, single-coat topcoat, basecoat, and clearcoat coating compositions that can be used in plastics painting are employed, the selection and use of these compositions being known to the skilled person.

EXAMPLES

Preparation Example 1

Synthesis of a (meth)acrylate (co)polymer

A premix is produced, consisting of an initiator solution of 94.5 g of an aromatic hydrocarbons fraction having a boiling range of 158-172° C., and 57.9 g of di-tert-butyl peroxide initiator. This mixture is transferred to a dropping funnel.

Placed in a 2nd dropping funnel is a premix consisting of 1869.9 g of ethylhexyl acrylate and 684.6 g of hydroxyethyl acrylate.

A laboratory reactor with a capacity of 4 l, equipped with a stirrer, 2 dropping funnels (one each for the initiator solution and for the monomer mixture), a nitrogen inlet tube, an internal thermometer and a reflux condenser is charged with 1022.4 g of an aromatic hydrocarbons fraction having a boiling range of 158-172° C.

The solvent introduced is heated to 150° C. After this temperature has been reached, the monomer mixture, over the course of 4 hours, and the initiator mixture, over the course of 4¾ hours, are added at a uniform rate, with stirring, to the initial charge. The first addition of initiator takes place 15 minutes before the first addition of monomer, and then continuously over a period of 4.5 hours after that. The monomer mixture is added continuously over a period of 4 hours. During the polymerization, there is an exothermic reaction, with the temperature being held at 150° C. on a continued basis, by means of cooling.

After the end of the additions, the mixture is held at 150° C. for 1 hour more, and then cooled.

The resulting methacrylate copolymer solution is adjusted with the aromatic hydrocarbons fraction to a solids content of 67% by weight (forced-air oven: 1 h at 130° C.).

The (meth)acrylate (co)polymer thus prepared had an OH number of 131 mg KOH/g, a glass transition temperature $T_g$ of −70° C., and a nonvolatile fraction of 67% by weight.

Preparation Example 2

Preparation of a Polyamide Thickener Paste Containing Polyamide Wax Particles (C)

30 parts by weight of Disparlon 9600-20X[1] from Erbslöh and 70 parts by weight of Macrynal SM510 N[2] from Cytec Surface Specialities were mixed and homogenized in a laboratory mill.

[1] Dispersion of polyamide wax particles in organic solvents (alcohols, xylene). The nonvolatile fraction of the dispersion is 20% by weight.
[2] Dispersion of a (meth)acrylate (co)polymer having an OH number of 150 mg KOH/g and a glass transition temperature $T_g$ of 36° C. in organic solvents (butyl acetate, xylene, solvent naphtha). The nonvolatile fraction of the dispersion is 60% by weight.

Preparation of Clearcoat Coating Compositions

In accordance with Table 1, the comparative compositions 1 and 2 and a composition 3 were prepared by mixing their constituents and homogenizing the resulting mixtures. The compositions were storable for a number of weeks without loss of quality. The compositions were mixed in each case with an isocyanate-based crosslinker based on a trimeric hexamethylene diisocyanate (composition of this crosslinker solution: Desmodur N 3390 from Bayer MaterialScience and equal parts of butyl acetate and an aromatic hydrocarbons fraction having a boiling point between 158° C.-172° C., to give a nonvolatile fraction of 68% by weight) and applied to a substrate, as described later on below, within 10 minutes. The mixing ratio of the mixtures 1, 2, and 3 from Table 1 and the crosslinker solution was 100 parts by weight of millbase to 30 parts by weight of crosslinker solution. All of the clearcoat coating compositions were adjusted to spray viscosity (38 seconds in the ISO4 cup at 23° C.) using butyl acetate.

TABLE 1

| Compositions without crosslinker component (B) | | | |
|---|---|---|---|
| | Comparative composition 1 | Comparative composition 2 | Composition 3 |
| (Meth)acrylate (co)polymer (A1)[1] | 41.24 | 41.24 | 41.24 |
| (Meth)acrylate (co)polymer (A2)[2] | 9.80 | 9.80 | 9.80 |
| Polyester for urea compound (E)[3] | 14.10 | | 8.00 |
| Paste of urea compound[4] | | 16.00 | 8.00 |
| Polyamide thickener paste[5] | 4.00 | | 2.00 |
| n-Butyl acetate | 10.20 | 12.30 | 10.30 |
| BYK 325[6] | 0.16 | 0.16 | 0.16 |
| UVA Tinuvin 384[7] | 1.30 | 1.30 | 1.30 |
| HALS Tinuvin 292[8] | 0.80 | 0.80 | 0.80 |
| Butyl acetate | 2.70 | 2.70 | 2.70 |
| Butylglycol acetate | 7.70 | 7.70 | 7.70 |
| Xylene | 7.00 | 7.00 | 7.00 |
| Butyl acetate | 1.00 | 1.00 | 1.00 |
| Total: | 100.00 | 100.00 | 100.00 |

* All figures in % by weight
[1] Macrynal SM 510 N from Cytec Surface Specialities (nonvolatile fraction: 60% by weight, OH number (resin) = 150 mg KOH/g, $T_g$ (resin) = 36° C.).
[2] (Meth)acrylate (co)polymer as per Preparation Example 1 (nonvolatile fraction: 67% by weight, OH number (resin) = 131 mg KOH/g, $T_g$ (resin) = −70° C.).
[3] Setal 166 SS-80 from Nuplex Resins (80% strength dilution of a polyester (OH number (resin) = 191 mg KOH/g, $T_g$ (resin) = −25° C.) in xylene/butyl acetate, nonvolatile fraction: 80% by weight.
[4] Setal 82166 SS-64 from Nuplex Resins (urea-modified polyester; mixture based on Setal 166 SS-80 with methoxypropylamine as amine component of the urea (nonvolatile fraction: 64% by weight, content of nonvolatile active urea substance, based on the polyester: 4.1% by weight).
[5] Polyamide thickener paste as per Preparation Example 2
[6] Commercial flow control additive
[7] Commercial UV absorber
[8] Commercial UV absorber Production and Properties of Clearcoats 1-4 and Also Properties of Compositions 1-4

The clearcoat coating compositions were applied pneumatically using a Köhne automated applicator. The applied compositions 1, 2, and 3 were subsequently cured at 90° C. for 30 minutes in each case. In addition, a further comparative composition, as per V5 from WO2004111139, was prepared (clearcoat coating compositions 4), applied pneumatically using a Köhne automatic system, and cured in accordance with the experimental instructions in WO2004111139 at 140° C. for 30 minutes, to produce clearcoat 4.

For the purpose of compiling run tables, the clearcoat coating compositions were applied in a wedge. In this case, the clearcoat coating compositions each covered a film-thickness range from 10 to 60 micrometers in the baked paint film.

The run stability was determined on coil-coated test panels with a size of 320×600 mm, with a diagonal row of holes. The run stability was evaluated by determining the film thickness of the dry clearcoat in each case, as a function of the length of runs at the row of holes.

For determining the leveling and the appearance, the clearcoat coating compositions were applied at constant dry film thickness, at 20 and 35 micrometers in each case, to coil-coated test panels with a size of 500×200 mm with no holes, and cured. Evaluation took place by means of Wavescan measurements (longwave/shortwave) in the film-thickness range indicated.

The test for shear stability of compositions 1-4 was carried out by stirring the compositions for a number of days (7 days) at a stirring speed U=20 min$^{-1}$. This was followed by a determination of the time-dependent viscosity using a rotational rheometer (2D method) of both the unexposed samples and of the samples exposed to the stirring test for 7 days. In this case, the paint specimens under investigation were first conditioned at 23° C. for about 10 minutes, then exposed for 5 minutes to a shear rate of 1000 sec$^{-1}$ (loading phase) and immediately thereafter (unloading phase) switched to a shear rate of 1 sec$^{-1}$ for 8 minutes. From the evaluation of the time-dependent change in viscosity, the rheological damage to the material by preceding stirring exposure is determined from the rises after 10 s and 60 s. If a drop in the rise behavior is found as a result of the preceding stirring exposure, in comparison to the sample not exposed to stirring, it is possible, through the percentage loss of rise in a comparison of different samples, to determine the sample which is more stable to shear in comparison to other samples.

The storage stability test on the clearcoat samples was carried out by storing the clearcoat samples at room temperature (23° C.) and at an elevated storage temperature (40° C.) for a period of several days. The samples are subsequently measured by means of efflux viscosity and/or by rheological measurements using a rotational viscometer, and compared with one another. From the differences and changes in the efflux times and in the rheological behavior, changes are then possible in the viscosity and rheology behavior under the different storage conditions of each of the samples, such as a percentage increase in the efflux time in comparison to the fresh sample.

TABLE 2

Properties of clearcoats 1-4 and compositions 1-4

| | Comparative clearcoat 1 | | Comparative clearcoat 2 | | Clearcoat 3 according to the invention | | Comparative clearcoat 4 | |
|---|---|---|---|---|---|---|---|---|
| Run limit | 53 micrometers | | 40 micrometers | | 52 micrometers | | 45 micrometers | |
| Leveling and/or appearance at | LW | SW | LW | SW | LW | SW | LW | SW |
| 20 micrometers | 38 | 25 | 31 | 11 | 20 | 8 | 40 | 25 |
| 30 micrometers | 28 | 10 | 18 | 7 | 13 | 5 | 28 | 13 |
| Shear stability or reduction in viscosity | −6% | | −10% | | −3% | | −15% | |
| Storage stability at 40° C., reduction in viscosity | satisfactory/ good/no sedimentation or settling of the rheological agent | | unsatisfactory/ poor/ sedimentation and settling of the rheological agent | | satisfactory/ good/no sedimentation or settling of the rheological agent | | unsatisfactory/ poor/ sedimentation and settling of the rheological agent, bittiness | |

The results shown in Table 2 demonstrate that the clearcoat produced from the clearcoat coating composition of the invention exhibits an outstanding balance between the application qualities of leveling and run stability. At the same time, the composition according to the invention has good stability under shearing stress and on long-term storage—that is, its profile of rheological properties and its viscosity alter only slightly under shearing stress and on storage.

What is claimed is:

1. A solvent-containing clearcoat coating composition comprising:
    (A) 30% to 80% by weight, based on the nonvolatile fraction of the overall clearcoat coating composition, of an OH-functional (meth)acrylate (co)polymer component composed of
        (A1) 30%-99% by weight, based on the mass of the nonvolatile fraction of the OH-functional (meth)acrylate (co)polymer component (A), of at least one OH-functional (meth)acrylate (co)polymer having an OH number of 60-200 mg KOH/g and a glass transition temperature $T_g$ of 15° C. to 100° C., and
        (A2) 1%-70% by weight, based on the mass of the nonvolatile fraction of the OH-functional (meth)acrylate (co)polymer component (A), of at least one OH-functional (meth)acrylate (co)polymer having an OH number of 60-200 mg KOH/g and a glass transition temperature $T_g$ of 90° C. to 35° C., wherein the amount of (A1) is more than twice the amount of (A2) by weight;
    (B) a crosslinker component comprising
        at least one crosslinking agent having functional groups that are reactive toward OH groups;

(C) 0.02%-1.2% by weight, based on the mass of the nonvolatile fraction of the OH-functional (meth)acrylate (co)polymer component (A), of at least one polyamide;

(D) 0.04%-2.9% by weight, based on the mass of the nonvolatile fraction of the OH-functional (meth)acrylate (co)polymer component (A), of at least one urea compound which is an adduct of a polyisocyanate and methoxypropylamine; and (E) 10% to 50% by weight, based on the mass of the nonvolatile fraction of component (A), of a polyester having an OH number of 8-280 mg KOH/g and a glass transition temperature $T_g$ of −80° C. to 20° C.

2. The solvent-containing clearcoat coating composition of claim 1, wherein the (meth)acrylate (co)polymers (A1) and (A2) have an OH number of 70-180 mg KOH/g.

3. The solvent-containing clearcoat coating composition of claim 1, wherein the crosslinking component (B) comprises as crosslinking agent(s) at least one polyisocyanate and/or at least one amino resin.

4. The solvent-containing clearcoat coating composition of claim 1, wherein the crosslinking agents in the crosslinking component (B) are nonblocked polyisocyanates.

5. The solvent-containing clearcoat coating composition of claim 3, wherein the crosslinking agent is a trimeric hexamethylene diisocyanate.

6. The solvent-containing clearcoat coating composition of claim 1, wherein the solvent-containing clearcoat composition is a two-component clearcoat coating composition.

7. The solvent-containing clearcoat coating composition of claim 1, wherein the polyamides (C) are synthetic polyamide waxes.

8. The solvent-containing clearcoat coating composition of claim 1, wherein the polyamides (C) are reaction products of monomeric polyamines and (hydroxy) fatty acids which comprise 16 to 20 C atoms per molecule.

9. A process for preparing the solvent-containing clearcoat coating composition of claim 1, the process comprising mixing the OH-functional (meth)acrylate (co)polymer component, the crosslinker component, the polyamide, the urea compound, and the polyester together.

10. The process of claim 9, wherein the OH-functional (meth)acrylate (co)polymer component (A) is mixed with the further constituents, apart from the crosslinker component (B), and the crosslinker component (B) with at least one organic solvent added is mixed in only within 30 minutes prior to application to a substrate.

11. The process of claim 9, wherein the urea compound is added in the form of a paste which comprises a mixture of the urea compound with a polyester and/or a (meth)acrylate (co)polymer and at least one organic solvent.

12. The process of claim 9, wherein the polyamides are added in the form of a dispersion which comprises a mixture of the polyamides with a (meth)acrylate (co)polymer and at least one organic solvent.

13. A method of producing a cured clearcoat, the method comprising applying the solvent-containing clearcoat coating composition of claim 1 to a substrate, and subsequently thermal curing at a temperature of 40 to 190° C.

14. A clearcoat on a substrate, comprising the clearcoat coating composition of claim 1 coated onto a substrate.

* * * * *